United States Patent
Lin et al.

(10) Patent No.: US 7,346,638 B2
(45) Date of Patent: Mar. 18, 2008

(54) FILTERING, EQUALIZATION, AND POWER ESTIMATION FOR ENABLING HIGHER SPEED SIGNAL TRANSMISSION

(75) Inventors: Xiaofeng Lin, Richardson, TX (US); Jin Liu, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 838 days.

(21) Appl. No.: 10/719,539

(22) Filed: Nov. 21, 2003

(65) Prior Publication Data
US 2005/0114426 A1    May 26, 2005

(51) Int. Cl.
*G06F 17/10* (2006.01)
(52) U.S. Cl. .................................................. 708/300
(58) Field of Classification Search ................ 708/300, 708/301–323
See application file for complete search history.

(56) References Cited

U.S. PATENT DOCUMENTS

| | | | | |
|---|---|---|---|---|
| 5,638,311 A * | 6/1997 | Fujii et al. | .................. | 708/322 |
| 5,721,694 A * | 2/1998 | Graupe | ...................... | 702/191 |
| 6,073,152 A * | 6/2000 | De Vries | .................... | 708/321 |
| 7,010,226 B2 * | 3/2006 | Le Sauze et al. | ............. | 398/49 |
| 7,023,981 B2 * | 4/2006 | Stephens et al. | ............ | 379/386 |
| 2004/0039763 A1 * | 2/2004 | Koizumi et al. | ............ | 708/300 |

OTHER PUBLICATIONS

"Pulse Extraction: A Digital Power Spectrum Estimation Method for Adaptation of Gbps Equalizers", by Xiaofeng Lin, et al, Proceedings of the IEEE International Symposium on Circuits and Systems, May 25-28, 2003.
"A CMOS Analog Continuous-Time FIR Filter for 1Gbps Cable Equalizer", by Xiaofeng Lin, et al, Proceedings of the IEEE International Symposium on Circuits and Systems, May 25-28, 2003.

* cited by examiner

*Primary Examiner*—Tan V. Mai
(74) *Attorney, Agent, or Firm*—Miller Patent Services; Jerry A. Miller

(57) ABSTRACT

A power spectrum estimator consistent with certain embodiments has a pulse extraction circuit that compares a digital input signal with a delayed version of the digital input signal to produce an output signal containing extracted pulses. An averaging circuit receives the output pulse and produces therefrom an averaged signal representing the averaged value of the output signal. A subtracter subtracts a reference signal from the averaged signal to produce a difference signal. An absolute value circuit converts the difference signal to an error signal by taking the absolute value of the difference signal. This abstract is not to be considered limiting, since other embodiments may deviate from the features described in this abstract.

29 Claims, 7 Drawing Sheets

FILTERING, EQUALIZATION, AND POWER ESTIMATION FOR ENABLING HIGHER SPEED SIGNAL TRANSMISSION

FIELD OF THE INVENTION

The present invention relates generally to high-speed signal transmission technology, and more particularly to improved filtering, equalization, and power estimation that enable higher speed signal transmission.

REFERENCE TO RELATED DOCUMENTS

This application is related to "Pulse Extraction: A Digital Power Spectrum Estimation Method for Adaptation of Gbps Equalizers", by Xiaofeng Lin, et al, Proceedings of the IEEE International Symposium on Circuits and Systems, May 25-28, 2003; and to "A CMOS Analog Continuous-Time FIR Filter for 1 Gbps Cable Equalizer", by Xiaofeng Lin, et al, Proceedings of the IEEE International Symposium on Circuits and Systems, May 25-28, 2003, which are hereby incorporated herein by reference.

BACKGROUND OF THE INVENTION

Digital or analog equalizers have been widely used in the receiver end of baseband communication systems to combat the intersymbol interference (ISI) caused by frequency dependent loss of metal media or high recording densities in hard disk drives. In recent years, with the increases in data rate among digital integrated circuits, equalizers are also being used at the transmitter or receiver end to compensate for high frequency loss in chip-to-chip communications. Digital or analog finite impulse response (FIR) filters have been used in these equalizers to remove ISI, interference, echoes, and/or noise. Digital FIR filters have been found to achieve high levels of computation precision, flexibility and effective adaptation, ultimately resulting in enhanced performance. Unfortunately, comparatively large circuit area, high power consumption and speed limitations of analog-to-digital converters (ADC) have prevented digital FIR filters from being used in high frequency (e.g., Gbps range) data equalizer designs Today, most analog FIR filters operate at the symbol rate, which means the tap delay interval is the same as the symbol period. They use a lower frequency-sampling clock, but are sensitive to the sampling phase. So timing information is recovered before or simultaneous with start of a data adaptation algorithm. Fractionally spaced FIR filters, on the other hand, are insensitive to the sampling phase and can compensate amplitude distortion with less noise enhancement with a higher sampling frequency.

Electrical equalizers commonly use various techniques to adapt to different transmission lengths, environment thermometer, and process technology. In certain techniques, an error signal relating to the quality of the received data or bit error rate (BER) is generated and used to tune the transfer function of the equalization filter.

There is always the need to develop improved filtering, equalization, and power estimation approaches to support the demand for ever higher data speed transmissions within systems and between systems.

SUMMARY OF THE INVENTION

An equalizer consistent with certain embodiments of the present invention has a differential analog tapped delay line made of a plurality of N series coupled analog delay cells. Each cell includes a pair of differential inputs and a pair of differential outputs. The differential analog tapped delay line receives an input signal to be equalized. The differential input pair of the nth cell is coupled to the differential output pair of the (n-1)th cell such that current is mirrored from the output pair to the input pair to form N-1 differential taps. Each one of N-1 differential input multiplying digital to analog converters (MDAC) is coupled at its differential input at each differential tap, with each MDAC multiplying an analog signal at its input by a digital weighting factor value to produce an output at a differential output. A differential slicer receives a sum of the differential outputs from each of the MDACs and produces an equalized output.

A power spectrum estimator consistent with certain embodiments of the present invention has a pulse extraction circuit that compares a digital input signal with a delayed version of the digital input signal to produce an output signal containing extracted pulses. An averaging circuit receives the output pulse and produces an averaged value of the output signal to produce an averaged signal. A subtracter subtracts a reference signal from the averaged signal to produce a difference signal. An absolute value circuit converts the difference signal to an error signal by taking the absolute value of the difference signal.

An apparatus consistent with certain embodiments of the present invention estimates power in a signal, has a circuit for extracting pulses of a specified pulse width from the signal. Another circuit is coupled to the extracting circuit, for filtering the extracted pulses to produce a filtered pulse signal. Another circuit is coupled to the filtering circuit, for subtracting the filtered pulse signal from a reference to produce a difference signal representing an estimate of power in the signal.

Another apparatus consistent with certain embodiments of the present invention estimates power in a signal using a circuit for extracting pulses of a plurality of specified pulse widths from the signal to produce a extracted pulses at each specified pulse width. Another circuit coupled to the extracting circuit filters the extracted pulses of each specified pulse width to produce a plurality of filtered pulse signals. Another circuit is coupled to the extracting circuit for subtracting each of the filtered pulse signals from a corresponding reference to produce a plurality of difference signals. Another adder, coupled to the extracting circuit, adds each of the difference signals to produce a sum representing an estimate of power in the signal. Any of the power estimation embodiments described above can be used advantageously with one or more of the equalizer embodiments.

The above overviews are intended to illustrate exemplary embodiments which will be best understood in conjunction with the detailed description to follow, and are not intended to limit the scope or meaning of the appended claims. As those skilled in the art will appreciate upon consideration of the present teachings, there are many other possible embodiments of the present invention.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION OF THE INVENTION

Figure 1:
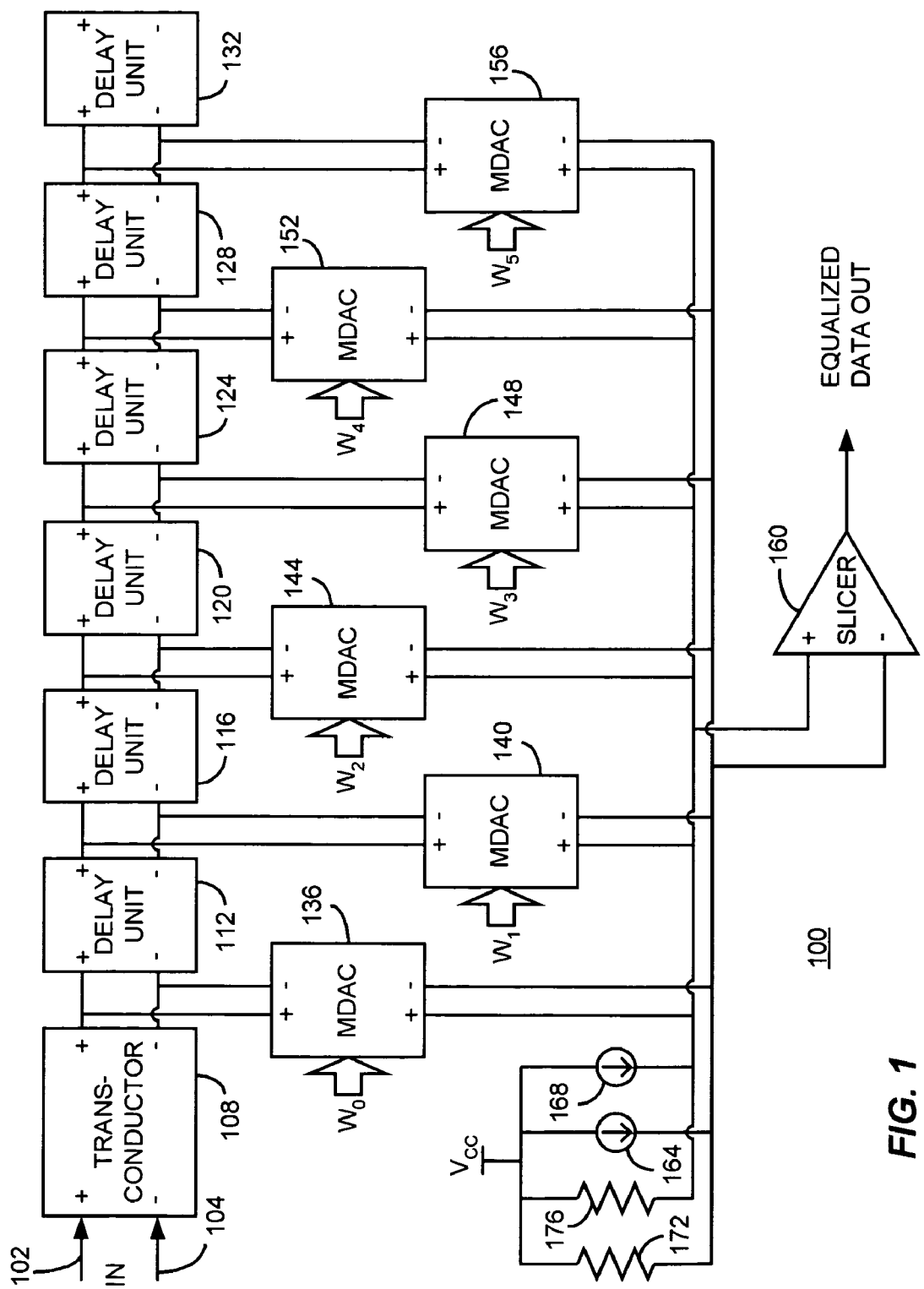
FIG. 1 is a block diagram of an equalizer circuit consistent with certain embodiments of the present invention.

While this invention is susceptible of embodiment in many different forms, there is shown in the drawings and will herein be described in detail specific embodiments, with the understanding that the present disclosure of such embodiments is to be considered as an example of principles and not intended to limit the invention only to the specific embodiments shown and described. In the description below, like reference numerals are used to describe the same, similar or corresponding parts in the several views of the drawings.

The term "another", as used herein, is defined as at least a second or more. The terms "including" and/or "having", as used herein, are defined as comprising at least the items described, although more than the described items may also be comprised (i.e., open language). The terms "coupled" and "connected", as used herein are synonymously defined as operatively connected, although not necessarily directly, and not necessarily mechanically. Thus, two devices can be operatively coupled together without being physically attached directly to one another. For example, two circuits might be "coupled together" under this definition even though an amplifier or filter might be disposed between the two circuits. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "random" is intended to encompass both truly random and pseudorandom without limitation. Thus, the term "random data" encompasses both random and pseudorandom data. The term "average" as used herein is not necessarily a strict mathematical average, but rather can simply be a low pass filtered representation of a signal. Thus, for example, a low pass filtered signal may be only an approximately average value, may be proportional to an average value, or may be time varying as voltages and currents associated with circuit elements such as capacitors and inductors decay over time. In certain embodiments, simple counting can be used as an equivalent operation to averaging. The term "delay unit" is used synonymously with the term "delay cell" to mean any circuit that produces an incremental time delay such as, for example, many known types of delay elements that are used in multiple cascaded iterations to produce a delay line. Examples of such delay units include buffer amplifiers, bucket-brigade devices, inverters, cascaded source followers, LC transmission lines, digital shift registers, unity gain amplifiers with a sampling clock and other such devices that have a delay between input and output.

FIG. 1 is a block diagram depicting a transversal Finite Impulse Response (FIR) filter 100 consistent with certain embodiments. Such a filter structure can be used for any filtering operation such as equalization functions. In this illustrative embodiment, a six tap second order FIR filter structure is depicted, but this should not be considered limiting since any suitable filter structure could be used, such as transversal filter structures with one or more taps. The input signal to be filtered is shown as a differential voltage signal applied to positive and negative input nodes 102 and 104 of a transconductor (a voltage to current converter) 108. Transconductor 108 converts the input voltage signal to a current signal that is used in further processing.

The differential output of transconductor 108 is applied to a delay line made up of cascaded delay units (or delay cells) 112, 116, 120, 124, 128 and 132. Each of delay units 112, 116, 120, 124 and 128 serve as a part of the delay line, which in general may have N such delay units. Delay unit 132 serves as a terminator to delay unit 128 so that delay unit 128 is terminated in the same manner as the other delay units. Any circuit that simulates the delay unit's load could be substituted equivalently.

The connection points for the cascaded delay units, each of which are designed to be differential current mode connections, represent taps of the tapped delay line. Each of the taps of the delay line are differentially coupled to a Multiplying Digital to Analog Converter (MDAC) with MDAC 136 having a first input differentially coupled to the input of the delay line (the differential input of delay unit 112). A second input of MDAC 136 receives a digital tap weight value $W_0$. MDAC 136 then multiplies the weight value $W_0$ by the input of the first delay unit 112 to produce a current mode analog multiplied value.

MDAC 140 is similarly coupled to the input of the second delay unit 116 (the output of the first delay unit 112) and multiplied by a digital tap weight value $W_1$ to produce a second current mode analog multiplied value. MDAC 144 is coupled to the input of the third delay unit 120 (the output of the second delay unit 116) and multiplied by a digital tap weight value $W_2$ to produce a third current mode analog multiplied value. MDAC 148 is coupled to the input of the fourth delay unit 124 (the output of the third delay unit 112) and multiplied by a digital tap weight value $W_3$ to produce a fourth current mode analog multiplied value. MDAC 152 is coupled to the input of the fifth delay unit 128 (the output of the fourth delay unit 112) and multiplied by a digital tap weight value $W_4$ to produce a fifth current mode analog multiplied value. MDAC 156 is coupled to the input of the sixth delay unit 132 (the output of the fifth delay unit 112) and multiplied by a digital tap weight value $W_5$ to produce a sixth current mode analog multiplied value. Thus, each junction where an MDAC is coupled to the delay line is considered a tap for purposes of this document. Each of the digital tap weight values in this embodiment is represented as a thermometer coded digital value, but this should not be considered limiting, since other codes could be used with suitable modification of the circuit structure (e.g., binary code, 1 of N code, etc.). Thermometer coding is preferred because code changes are monotonic (to help avoid glitches), has better differential nonlinearity and integral nonlinearity compared to many other coding schemes.

The outputs of each of the MDAC's 136, 140, 144, 148, 152 and 156, being current mode signals, are added together by simply coupling the nodes together and are applied to the input of a differential slicer 160 (such as a transconductance differential comparator amplifier) to produce equalized data out. In this embodiment, a pair of current sources 164 and 168 and pull-up resistors 172 and 176 are coupled to the differential inputs of slicer 160, since the outputs of the MDAC's are configured as open drain output circuits.

Thus, An equalizer consistent with certain embodiments has a differential analog tapped delay line made of a plurality of N series coupled analog delay cells, wherein each cell includes a pair of differential inputs and a pair of differential outputs, and wherein the differential analog tapped delay line receives an input signal to be equalized. The differential input pair of the nth cell is coupled to the differential output pair of the (n-1)th cell such that current is mirrored from the output pair to the input pair to form N-1 differential taps. Each one of N-1 differential input multiplying digital to analog converters (MDAC) is coupled at its differential input at each differential tap, with each MDAC multiplying an analog signal at its input by a digital weighting factor value to produce an output at a differential output. A differential slicer receives a sum of the differential outputs from each of the MDACs and produces an equalized output.

Figure 2:
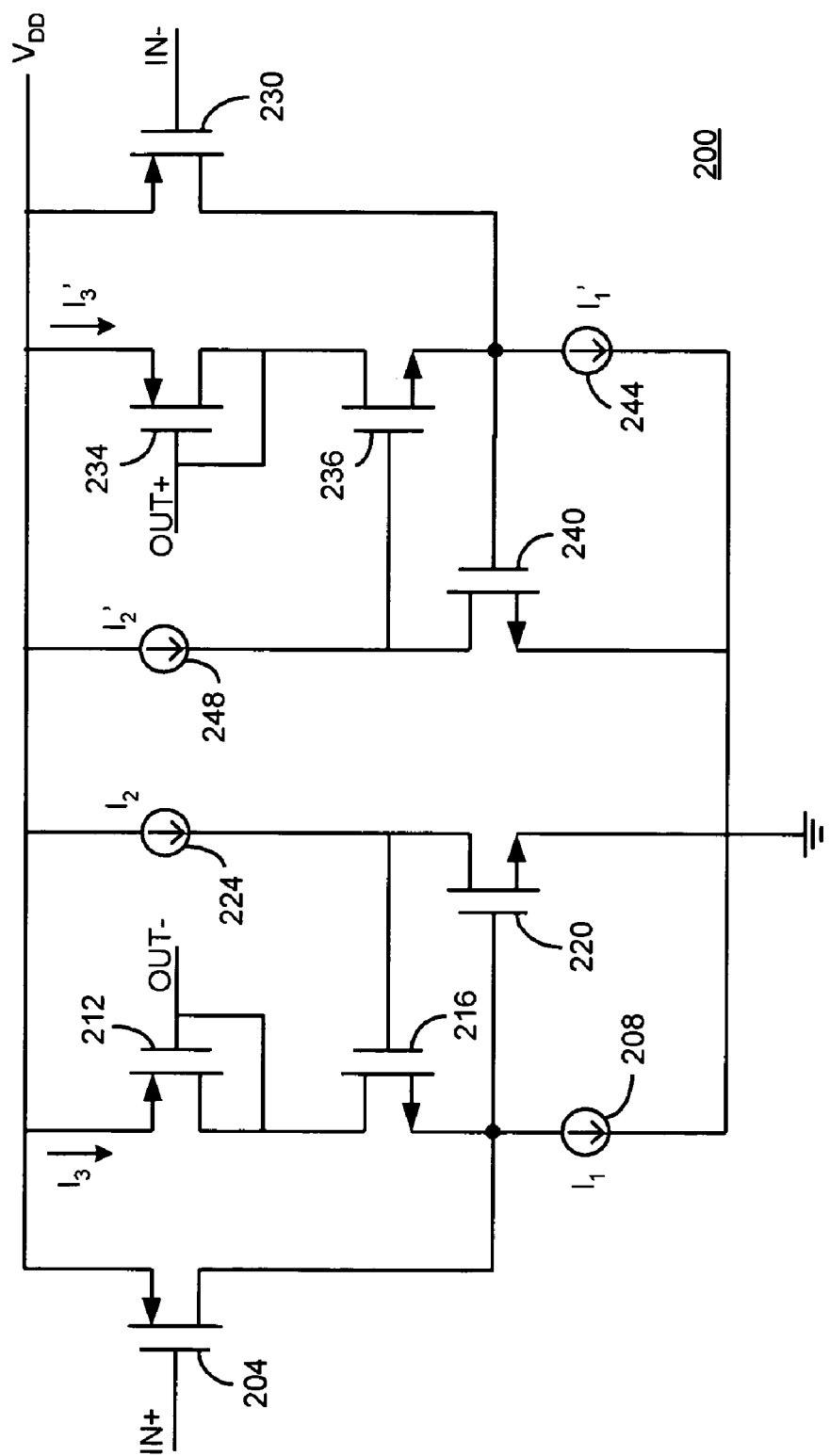
FIG. 2 is a circuit diagram of a delay circuit consistent with certain embodiments of the present invention.

Each of the delay units depicted in filter or equalizer circuit 100 as described above, can be realized in any number of ways. One such realization using commercially available complementary metal oxide semiconductor (CMOS) technology is depicted in FIG. 2 as delay unit 200. Each delay unit operates as an inverting buffer amplifier stage with unity gain. In this circuit, the positive input IN+ of the delay unit or delay cell is received at the gate of a P channel device 204 whose source is coupled to positive supply and whose drain is coupled to a current source 208 that supplies current $I_1$ to ground. The source of P channel transistor 212 is also coupled to positive supply while the gate and drain of transistor 212 are coupled together and to current source 208. The gate and drain connection is coupled to the drain of an N channel device 216 whose source is coupled to the current source 208. The gate of an N channel transistor 220 whose source is grounded and whose drain is coupled to a current source 224 that supplies current $I_2$. The gate of transistor 216 is coupled at the junction of the drain of transistor 220 and current source 224. The OUT− output of the delay cell is taken at the gate—drain connection point of transistor 212.

A mirror image of this circuit is provided in which the IN− input signal to the delay cell is applied to the gate of transistor 230, and the OUT+ output of the delay cell is taken at the gate—drain connection of transistor 234. Transistors 236 and 240 provide analogous connection and function of transistors 216 and 220 to process the IN− signal. Current source 244 is analogous to current source 208 and supplies current $I_1'$ while current source 248 is analogous to current source 224 and supplies current $I_2'$.

The two mirror image delay circuits process analog signals at the inputs IN− and IN+ to produce a short signal delay that can be adjusted by adjusting the current sources $I_1$ and $I_1'$ over a relatively wide range to achieve a desired delay that depends upon the transistor geometries and the fabrication process. In addition, the quality factor (Q) of the resulting filter can be adjusted somewhat by tuning the values of $I_2$ and $I_2'$. While the $I_1$ currents and the $I_2$ currents are described as being used to adjust delay and Q, it should be noted that there is some level of interdependence in these currents which results in an adjustment to $I_2$ affecting delay somewhat and adjustment of $I_1$ affecting Q somewhat.

Figure 3:
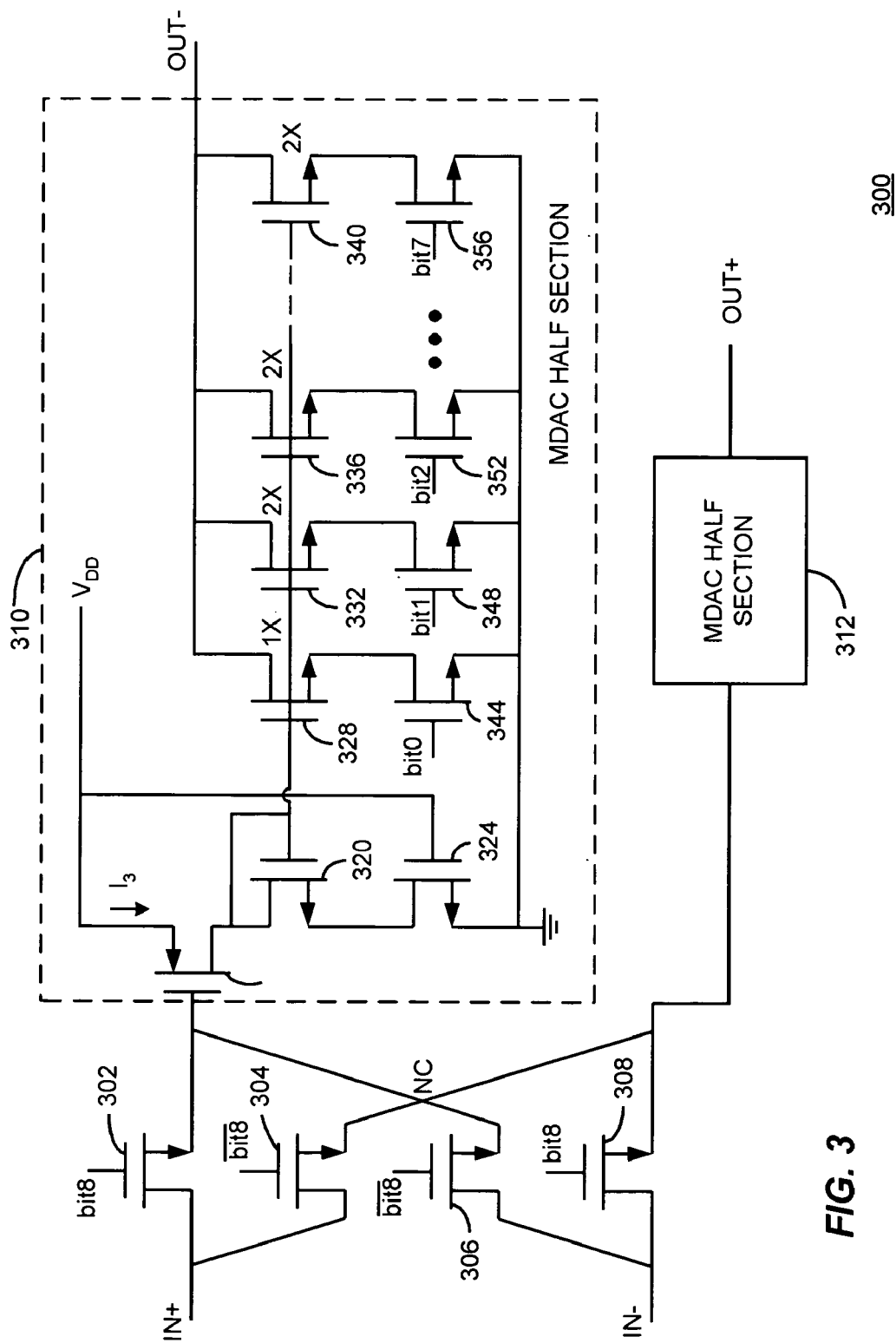
FIG. 3 is a circuit diagram of a multiplying digital to analog converter (MDAC) consistent with certain embodiments of the present invention.

The multiplying digital to analog converters (MDACs) of circuit 100 can also be realized in a number of different circuit configurations. One suitable configuration is shown as MDAC 300 of FIG. 3. This circuit arrangement also operates as a current mode device having an input transmission gate circuit made up of four N channel transistors 302, 304, 306 and 308 that receive the eighth bit of a thermometer coded tap weight value and diverts the inputs to IN+ and IN− accordingly. The input signals are then diverted to one of two MDAC half sections 310 or 312 depending upon the value of the eighth bit, which determines the sign of the tap weight. MDAC half sections 310 and 312 may be identical circuit configurations with 310 providing OUT− and circuit 312 providing OUT+.

As mentioned previously, the eighth bit (bit8) of the thermometer coded tap weight determines the sign of the tap weight. This value of bit8 is applied to the gates of transistors 302 and 308 while the inverse of bit8 is applied to the gates of transistors 304 and 306. The IN+ signal is applied to the drains of transistors 302 and 304 while the IN− input signal is applied to the drains of transistors 306 and 308. An output is taken from the connected sources of transistors 302 and 306 to drive the MDAC half section 310. An output is taken from the connected sources of transistors 304 and 308 to drive the MDAC half section 312. Thus, depending upon the binary value of bit8, IN+ will be diverted to one of the MDAC half sections 310 or 312, and IN− will be diverted to the other MDAC half section. Although the use of the thermometer code makes representation of positive and negative numbers for the digital weighting values, it should also be noted that a reversed connection between an the MDAC and the digital tap of the delay line can also be used to represent a value as a negative value. The input of half section 310 is applied to the gate of an N channel transistor 316, whose source is coupled to positive supply. The drain of transistor 316 is coupled to the drain and gate of transistor 320. The source of transistor 320 is coupled to the drain of transistor 324, whose source is grounded and whose gate is pulled high, to positive supply in this case. The gate of transistor 320 is further coupled to the gates of N channel transistors 328, 332, 336 through 340, where transistors 332, 336, through 340 are 2× geometries compared to transistor 328. The drains of transistors 328, 332, 336, through 340 are coupled together so that the output current is additive when a pull-up is used on the output and forms the open drain OUT− output of the MDAC half section.

The weight values are applied to transistors 328, 332, 336, through 340 to effect the multiplying digital to analog function. N channel Transistor 344 receives bit0 of the tap weight value at its source. Transistor 344's source is grounded and its drain is coupled to the source of transistor 328. Thus, whenever tap weight bit0 is high, transistor 344 is turned on and transistor 328 contributes current to the output OUT−. In a similar manner, N channel transistors 348, 352, through 356 are coupled to transistors 332, 336, through 340. Tap weight value bits bit1, bit2, through bit7 of the thermometer coded tap weight value are applied to the sources of transistors 348, 352, through 356 to determine which transistors contribute current to the output. Thus, depending upon the value of the thermometer coded tap weight bits, input current is multiplied at transistors 328, 332, 336 through 340 added and added together at the open drain output.

When an input is applied to half section 310, it is received at the gate of N channel device 316. Considering the situation wherein the gate of transistor 316 is coupled to OUT− of delay element 200 (at the gate—drain connection of transistor 212), the current I3 passing through transistor 212 is mirrored through transistor 316 and is multiplied by the weight value in transistors 328, 332, 336, through 340. A similar mechanism is used in MDAC half section 312 to produce the OUT+ output so that the outputs from MDAC half sections 310 and 312 together form a differential current mode output. As shown in circuit 100, resistors 172 and 176 together with current sources 164 and 168 provide output bias to the OUT− and OUT+ outputs of the MDACs 136, 140, 144, 148, 152 and 156. Coupling each of the OUT+ terminals together and each of the OUT− terminals together results in an adding of the output currents to slicer 160 which produces the equalized data output.

Most equalizer circuits such as 100 and similar devices utilize some form of adaptation to cause the tap weight values (e.g., $W_0$ through $W_5$) to adapt and converge to values that cause the filter or equalizer device to match, maximize or minimize some desired parameter. Such equalizers have been widely used in digital communication to compensate intersymbol interference (ISI). To adapt to different transmission lengths, environment thermometer, and process technology, an error signal relating to the quality of the received data or bit error rate (BER) can be generated and used to tune the transfer function of the equalization filter.

If the transmitted signal has been scrambled and is made up of randomly selected codes, the power spectrum of a long sequence of data is statistically predictable. By comparing the power spectrum between the equalized signal and a random code sequence, the difference can be used as an error signal to tune the coefficients of the analog FIR filter, for example using a random search algorithm. A conventional approach to power spectrum estimation might have several bandpass filters, each with a different center frequency, followed by a rectifier and a low pass filter to find the average signal power at several specific frequencies. The error signal can then taken to be the sum of absolute value of the power spectrum difference between the equalized signal and the random sequence. For very high frequency signals (for example, in the GHz range and greater), excess phase problems, parasitic reactances, small linear input range and high power consumption have proven problematic in realizing various implementations of bandpass filters used in conventional circuitry. Thus, it is often difficult to realize appropriate bandpass filters used in such circuits.

Figure 4:
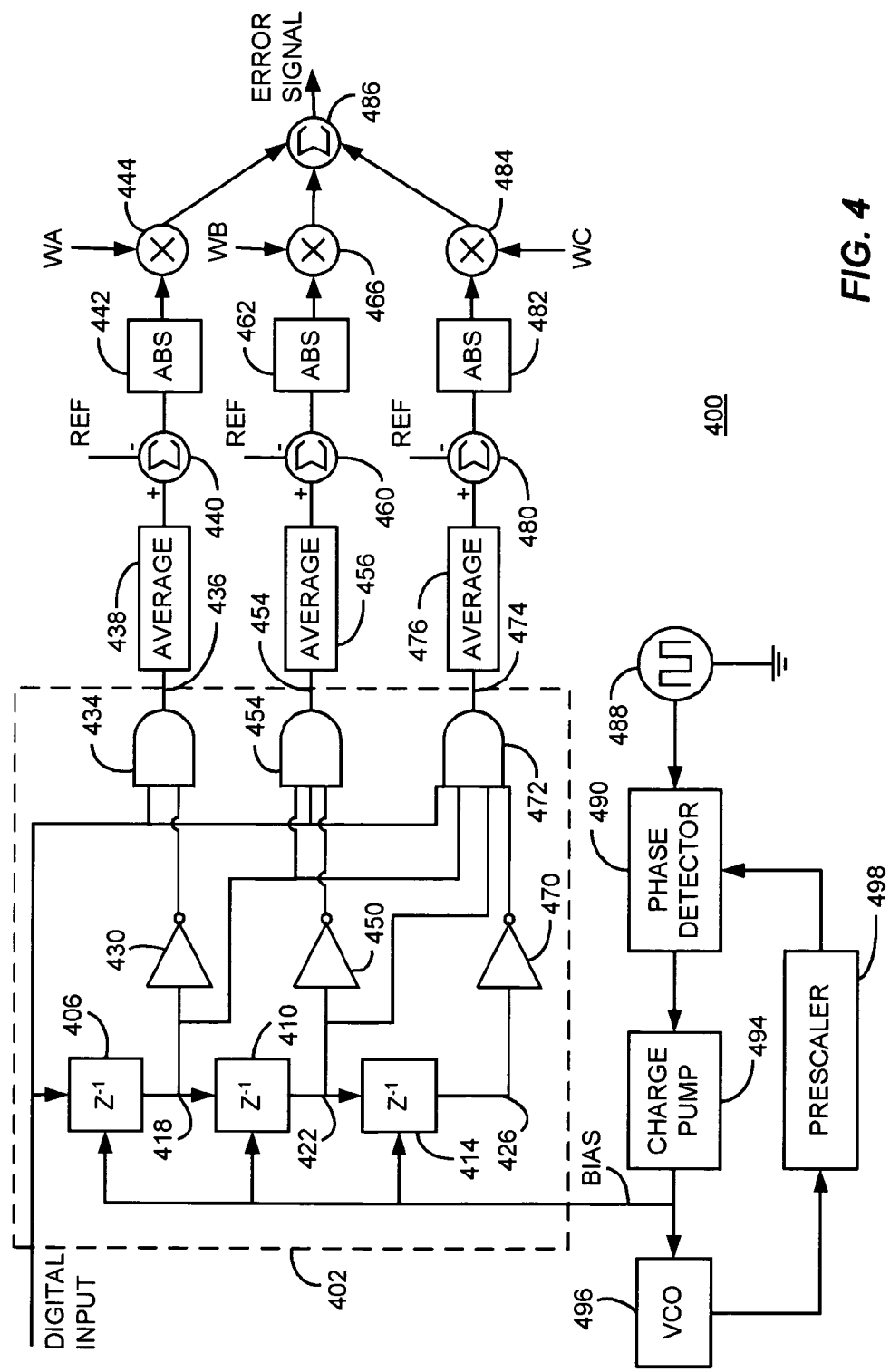
FIG. 4 is a block diagram of a power estimation circuit consistent with certain embodiments of the present invention.

An alternative to such circuitry consistent with certain embodiments is depicted as circuit 400 in FIG. 4. For baseband digital communications, digital pulses transmitted over cable without modulation, if the width and phase information of each pulse can be recovered, the transmitted signal will be fully recovered, and the ISI will be removed from the received signal. For a data sequence long and random enough, the average number pulses of each specific pulse width should be statistically predictable. Based on this assumption, the average number of pulses having a pulse width of interest for both the equalized signal and a reference signal or a random code sequence can be counted. Any signal representing the average of pulses of a selected pulse width can be used as a reference value REF. The absolute sum of differences between the average and a reference signal produces an error signal that can be used to tune the coefficients of an FIR filter.

In this exemplary embodiment 400, the power spectrum is measured by extracting pulses of three different pulse widths from the digital input signal and using those extracted pulses in estimating the power spectrum of the input signal.

The present embodiment was designed to operate using 0.25 um CMOS technology to achieve 125 ps group delay and biasing current of $I_1$ set to be approximately 240 uA and $I_2$ set to be approximately 20 uA. Under these conditions, with appropriate tap weight values, the −3 dB bandwidth of each stage is about 1.8 GHz, and the −3 dB bandwidth of the overall tapped delay line at the end of five delay units is 690 MHz. A six-tap delay line was selected for this embodiment as a good compromise between hardware complexity and design freedom. More taps causes greater hardware complexity, but gives greater freedom in design specification. This number of taps provided adequate protection from intersymbol interference for the system under test, while achieving a reasonable current drain with a relatively low bandwidth delay line. Other delay line designs could be used in other embodiments.

Those skilled in the art will appreciate upon consideration of this teaching that more or fewer different pulse widths can be used to approximate the power spectrum without limitation. The digital input signal is applied to a pulse extraction logic circuit 402 where it is passed down a tapped delay line having, in this example, three delay elements 406, 410 and 414. Thus, the tapped delay line provides tapped outputs at 418, 422 and 426 which are each delayed by one delay $Z^{-1}$ from it's respective input. In this implementation, each delay $Z^{-1}$ represents one symbol interval for the input data. Pulses lasting one symbol interval are extracted by inverting the output of delay element 406 at inverter 430 and processing that delayed output by applying a logic AND function at 434 to the digital data input and the output of the inverter 430. This produces a stream of pulses at 436 representing pulses having one symbol interval of duration. This stream of pulses at 436 is then approximately averaged using a low pass filter at 438. The low pass filter can be implemented using, for example, a simple R-C or L-C structure or can be implemented as a more complex passive, active, digital or analog filter as desired, without limitation. The average, as previously stated, need not meet a strict definition of average in the mathematical sense, but is the output of a low pass filter in this example.

A reference signal REF is generated by any suitable mechanism that produces a reference value representative of an average of pulses of the desired pulse width in the data stream. In one example, the reference signal REF can be generated by passing random data through a similar pulse extraction circuit (i.e., the same as delay 406, inverter 430 and AND gate 434) and then to an averaging low pass filter 438. The reference signal REF is then subtracted at 440 from the average of the extracted pulses to produce a signed error signal that can be made positive by taking the absolute value at 442. This error signal can then be used alone or in combination with error signals generated by extraction of pulses of different pulse widths to adjust the tap weights of the filter. In certain embodiments, the error signal can be weighted, (e.g., by weight WA) by multiplying the error with a weight value at 444.

Those skilled in the art will appreciate, upon consideration of the present teaching, that other reference signals could also be used, providing they have a similar frequency spectrum to that of the signal being equalized. For example, but not by way of any limitation, a repetitive stream of data that has a representative mix of pulses could be used. A square wave was also tested with reasonably good results. Additionally, a DC reference value that has been experimentally determined or adjusted for best performance could also be used.

To continue with the example illustrated in which pulses of three different widths are extracted, pulses lasting two symbol intervals are extracted by inverting the output of delay element 410 at inverter 450 and processing that delayed output by applying a logic AND function at 452 to the digital data input and the output of the inverter 450 and the signal at 418. This produces a stream of pulses at 454 representing pulses having two symbol intervals of pulse width. This stream of pulses at 454 is then approximately averaged using a low pass filter at 456. Again, the low pass filter can be implemented using, for example, a simple R-C or L-C structure or can be implemented as a more complex passive, active, digital or analog filter as desired, for example by using a digital signal processor (DSP), without limitation or adverse effects on embodiments of the present invention.

A second reference signal REF is generated, for example, by passing random data through a similar pulse extraction circuit (i.e., the same as delay 406, delay 410, inverter 450 and AND gate 452) and then to an averaging low pass filter similar to 456. The reference signal REF is then subtracted at 460 from the average of the extracted pulses to produce a signed error signal that can be made positive by taking the absolute value at 462. This error signal can also be used alone or in combination with error signals generated by extraction of pulses of different pulse widths (e.g., the error signal at the output of 442) to adjust the tap weights of the filter. As previously described, in certain embodiments, the various error signals can be weighted, by multiplying the error with a weight value. The error signal at the output of 462 is shown weighted by a weight value WB at 466.

To continue further with the example illustrated in which pulses of three different widths are extracted, pulses lasting three symbol intervals are extracted by inverting the output of delay element 414 at inverter 470 and processing that delayed output by applying a logic AND function at 472 to the digital data input and the output of the inverter 470 and the signals at 418 and 422. This produces a stream of pulses at 474 representing pulses having three symbol intervals of pulse width. This stream of pulses at 474 is then approximately averaged using a low pass filter at 476. Again, the low pass filter can be implemented using, for example, a simple R-C or L-C structure or can be implemented as a more complex passive, active, digital or analog filter as desired, without limitation.

A third reference signal REF is generated, for example, by passing random data through a similar pulse extraction circuit (i.e., the same as delay 406, delay 410 and delay 416, inverter 470 and AND gate 472) and then to an averaging low pass filter such one similar to 476. The reference signal REF is then subtracted at 480 from the average of the extracted pulses to produce a signed error signal that can be made positive by taking the absolute value at 482. This error signal can also be used alone or in combination with error signals generated by extraction of pulses of different pulse widths (e.g., the error signal at the output of 442 and/or 462) to adjust the tap weights of the filter. As previously described, in certain embodiments, the various error signals can be weighted, by multiplying the error with a weight value. The error signal at the output of 482 is shown weighted by a weight value WC at 484.

All three weighted error signals are shown added together at summer 486 to produce an overall error signal. Extraction of three pulse widths of one, two and three symbol intervals has been shown experimentally and by simulation to provide a very good representation of the power spectrum for the system that was tested and simulated, but those skilled in the art will appreciate upon consideration of the present teaching, that more or fewer pulse widths could be extracted and used for the power estimation.

In order to maintain accuracy of the delay times for delay elements 406, 410 and 414, a bias voltage or current can be applied to the delay elements. Such bias signal can be derived, for example from a phase-locked loop or delay-locked loop as illustrated. In this illustration, a reference clock 488 produces a reference clock signal that drives one input of a phase detector 490. The phase detector output drives a charge pump 492 that produces the bias signal as an output. The bias signal further controls a voltage-controlled oscillator (VCO) 496 to control the frequency of the VCO 496. The VCO output may drive a prescaler that in turn drives a second input of the phase detector 490 in a more or less conventional feedback control system that phase locks to a function of the reference oscillator.

By way of example, and not limitation of the invention, for 8b/10b code and with a transmission bit rate of 1 Gbps, the dominant width of pulses is 1 ns, 2 ns, and 3 ns. So, these pulse widths can be selected using the pulse extraction circuitry described above with $Z^{-1}$ equal to 1 ns. When counting the number of 1 ns width pulses using the above circuit, if the pulse width is larger than 1 ns, then a 1 ns wide pulse is extracted to avoid counting it twice or more. When counting 2 ns wide pulse, a 1 ns wide pulse is extracted from any pulse whose width is equal or larger than 2 ns. For 3 ns wide pulse extraction, a 1 ns wide pulse is extracted from any pulse whose width is equal or larger than 3 ns. In circuit 400 the digital input denotes the output from the slicer 160 of equalizer 100. The averaging filters 438, 456 and 476 can be realized with a low pass filter having a low cutoff frequency (i.e., a corner frequency much lower than 1 Ghz). No high frequency rectifier is utilized. Weight values WA, WB and WC can be determined experimentally or iteratively to obtain best equalizer performance. In experiments, good results were received without use of weight values (i.e., WA=WB=WC=1).

Thus, a power spectrum estimator consistent with certain embodiments has a pulse extraction circuit that compares a digital input signal with a delayed version of the digital input signal to produce an output signal containing extracted pulses. An averaging circuit receives the output pulse and produces an averaged value of the output signal to produce an averaged signal. A subtracter subtracts a reference signal from the averaged signal to produce a difference signal. An absolute value circuit converts the difference signal to an error signal by taking the absolute value of the difference signal.

Figure 5:
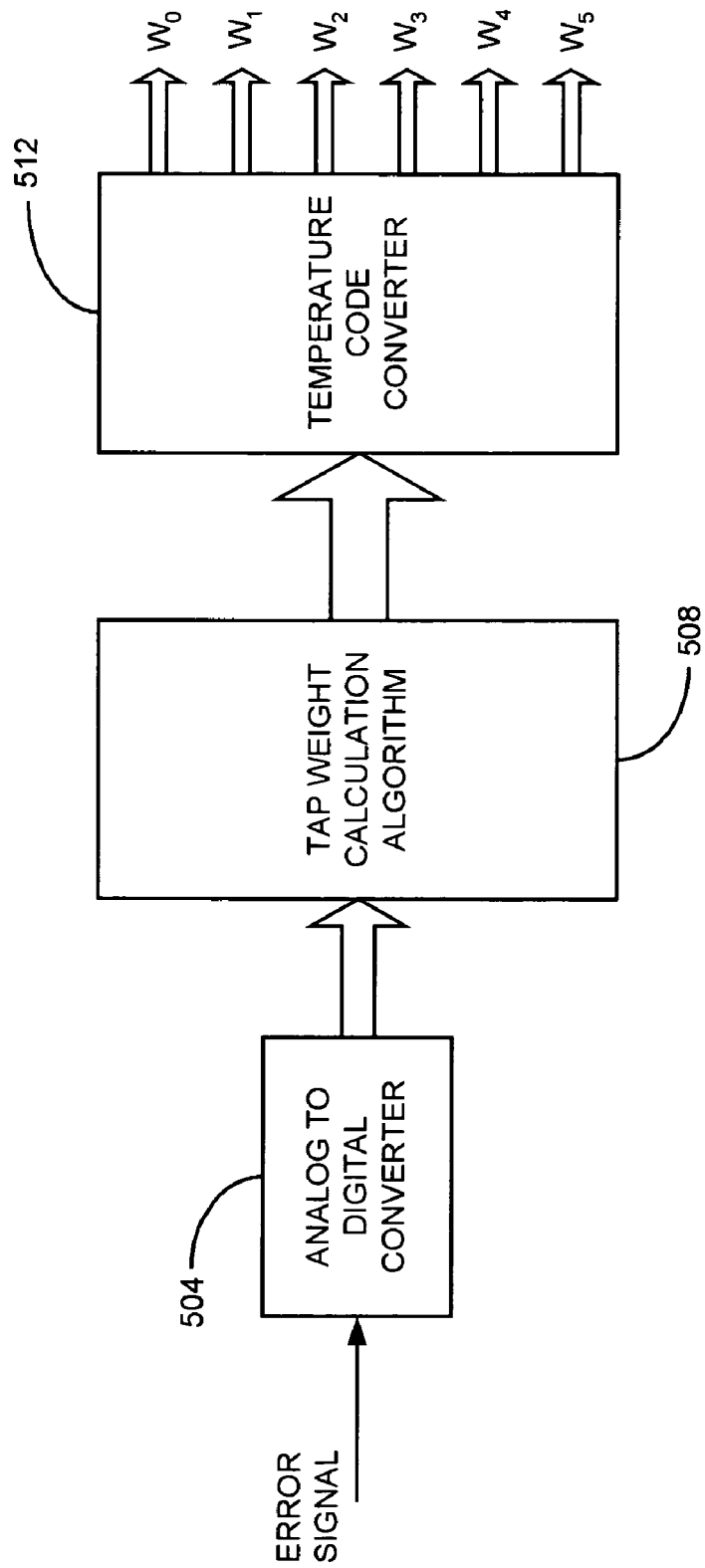
FIG. 5 is a block diagram showing conversion of the error signal to tap weights in a manner consistent with certain embodiments of the present invention.

Turning now to FIG. 5, the error signal output from 486 of circuit 400 is an analog signal can be applied to an analog to digital converter 504 for conversion to digital. The digital value of the error signal can be applied to a suitable tap weight calculation algorithm at 508, e.g., a program running on a programmed processor, for use in refining the tap weight values. These values can then be converted to thermometer code at a thermometer code converter 512 that converts the tap weights to thermometer coded weight values $W_0$ through $W_5$. These thermometer coded tap weight values are loaded into the MDACs of FIG. 1.

Figure 6:
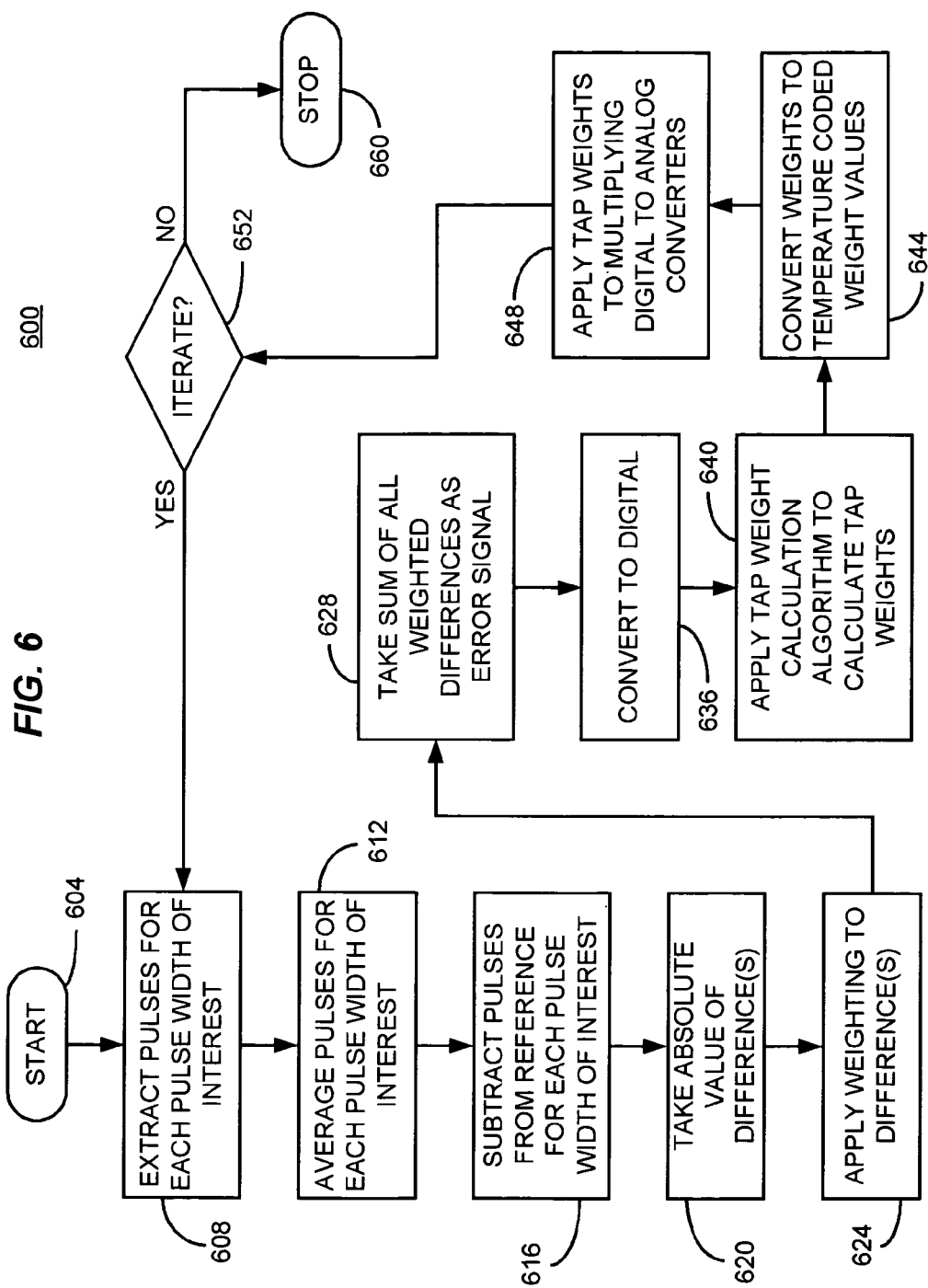
FIG. 6 is a flow chart of an equalizer and power estimation process consistent with certain embodiments of the present invention.

With reference to FIG. 6, a method that can be carried out in hardware, software and/or firmware embodiments of estimating power in a signal consistent with certain embodiments is depicted as process 600 starting at 604. The process proceeds at 608 with extracting pulses of a plurality of specified pulse widths from the signal to produce extracted pulses at each specified pulse width of interest. The extracted pulses are low pass filtered at 612 for each of the specified pulse widths to produce a plurality of filtered pulse signals. Each of the filtered pulse signals is subtracted at 616 from a corresponding reference to produce a plurality of difference signals. The absolute value of each of the difference signals is taken at 620 and a weighting value may be applied to each of the absolute values at 624. The sum of each of the difference signals is taken at 628 to produce a sum representing an estimate of power in the signal and an error signal that can be used to correct the tap weights.

The estimate of power can be converted to a digital value at 636 and applied to a filter tap weight calculating algorithm at 640 to calculate or update a filter tap weight value. These tap weights can be converted to a thermometer code at 644 and the thermometer coded tap weight values can be applied to the MDACs at 648. If the process is to be iterated at 652, control returns to 608. If not, the process ends at 660.

Figure 7:
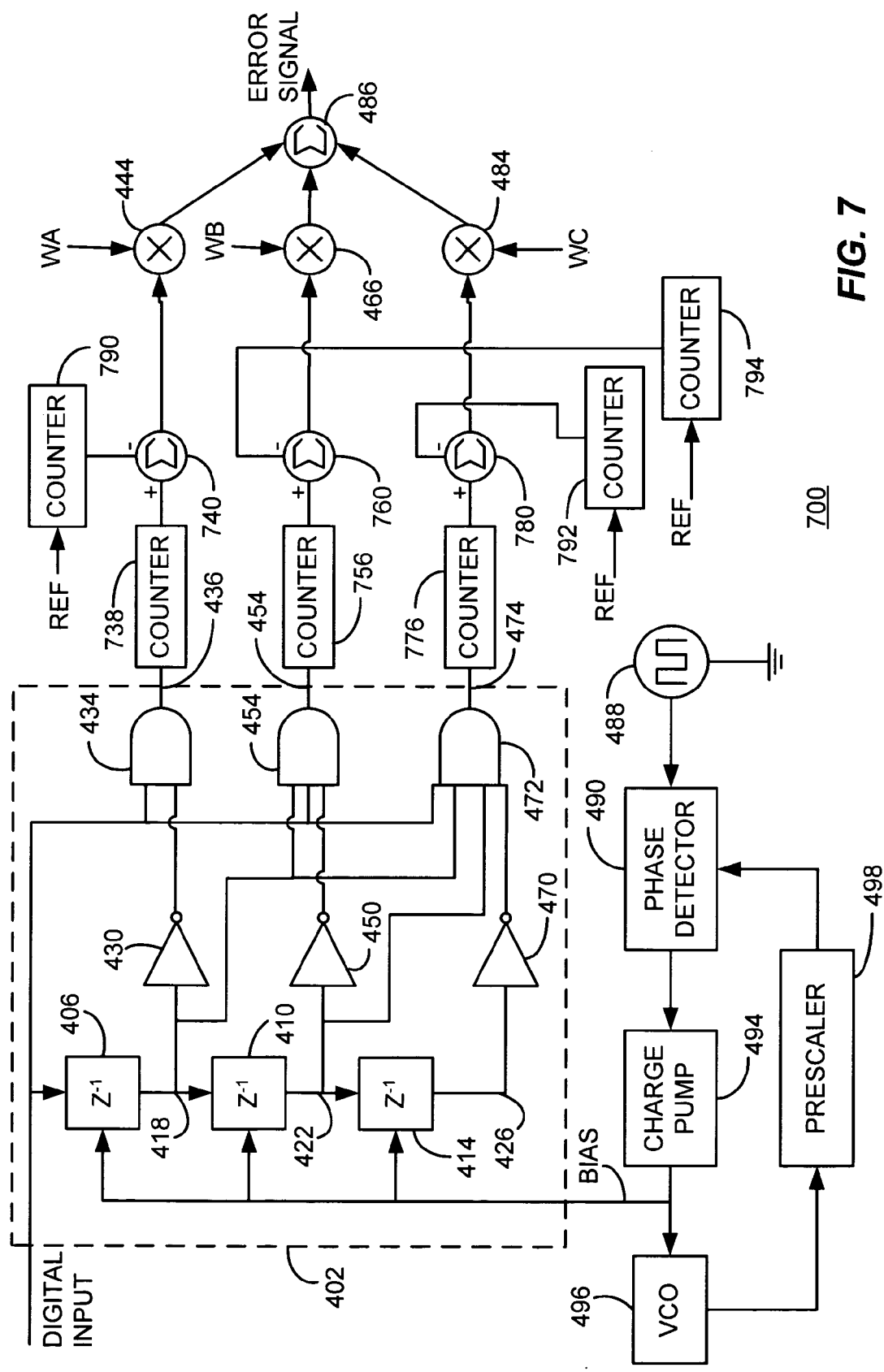
FIG. 7 is a block diagram of an alternative power estimation circuit consistent with certain embodiments of the present invention.

It should also be noted that since the output signal from the pulse extractor is a digital signal, the averaging and subsequent circuits can also be realized with a digital count which counts the number of pulses over a time interval and subtracts the number of pulses in the reference signal during a similar interval with a digital adder. FIG. 7 is a block diagram of an alternative power estimation circuit 700 consistent with certain embodiments of the present invention. In this embodiment, the averaging circuits 438, 456, and 476 of circuit 400 are replaced with counters 738, 756 and 776 that simply count the number of pulses from the pulse extraction logic circuit 402. The count values are then respectively subtracted from a reference count from a counters 790, 794 and 792 respectively that similarly counts a number of pulses from one of three reference signals. The subtracting takes place at adders 740, 760 and 780 respectively. The counts of counters 738, 756, 776 and 790 are taken over a time interval and are thus equivalent to a scaled averaging operation. As in circuit 400, the error signals from the adders can be weighted at 444, 466 and 484 and then added together at adder 486 to produce an overall error signal. Other variations will also occur to those skilled in the art upon consideration of the present teachings.

Thus, a power spectrum estimator consistent with certain embodiments has a pulse extraction circuit that compares a digital input signal with a delayed version of the digital input signal to produce an output signal containing extracted pulses. A counter circuit receives the output pulse and produces therefrom a count over a time interval representing the averaged value of the output signal. A subtracter subtracts a reference count from the averaged signal to produce a difference signal. The reference signal may be generated by passing a random digital signal through a counter.

An apparatus consistent with certain embodiments that estimates power in a signal, has a circuit for extracting pulses of a specified pulse width from the signal. Another circuit is coupled to the extracting circuit, for filtering the extracted pulses to produce a filtered pulse signal. Another circuit is coupled to the filtering circuit, for subtracting the filtered pulse signal from a reference to produce a difference signal representing an estimate of power in the signal.

Another apparatus consistent with certain embodiments estimates power in a signal using a circuit for extracting pulses of a plurality of specified pulse widths from the signal to produce a extracted pulses at each specified pulse width. Another circuit coupled to the extracting circuit filters the extracted pulses of each specified pulse width to produce a plurality of filtered pulse signals. Another circuit is coupled to the extracting circuit for subtracting each of the filtered pulse signals from a corresponding reference to produce a plurality of difference signals. Another circuit, coupled to the extracting circuit, adds each of the difference signals to produce a sum representing an estimate of power in the signal.

While the present embodiments have been described in terms of an equalizer application of an FIR filter, this should not be considered limiting since any analog or digital filter application can utilize certain of the principles described herein. Moreover, the power estimation arrangement used herein for adaptation of FIR filter weights could be used for other applications where estimation of power is useful. Such alternatives will become apparent to those skilled in the art upon consideration of the present teaching.

While certain embodiments herein were described in conjunction with specific circuitry that carries out the functions described, other embodiments are contemplated in which the circuit functions are carried out using equivalent analog or digital circuitry or software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors. Those skilled in the art will appreciate that aspects of the present invention can be carried out with hardware, software, or both—since hardware and software are interchangeable in many respects for implementing the present invention. This is the case since elements and means for performing functions included in the invention can be provided by hardware implementations, software implementations, or by hardware and software in combination.

Software and/or firmware embodiments may be implemented using a programmed processor executing programming instructions, that in certain instances are broadly described above in flow chart form or otherwise described herein, that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium (wired or wireless). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A power spectrum estimator, comprising:
   a pulse extraction circuit that compares a digital input signal with a delayed version of the digital input signal to produce an output signal containing extracted pulses;
   an averaging circuit receiving the output pulse and producing therefrom an averaged signal representing the averaged value of the output signal;
   a subtracter that subtracts a reference signal from the averaged signal to produce a difference signal; and
   an absolute value circuit that converts the difference signal to an error signal by taking the absolute value of the difference signal.

2. The power spectrum estimator according to claim 1, wherein the reference signal comprises a random digital signal passed through a pulse extraction circuit and an averaging circuit.

3. The power spectrum estimator according to claim 1, wherein the power spectrum estimator estimates the power spectrum using pulse extraction logic circuits that extract pulses of at least one of: one, two and three different pulse widths.

4. The power spectrum estimator according to claim 1, wherein the averaging circuit comprising a low pass filter.

5. The power spectrum estimator according to claim 1, further comprising a weighting value multiplier that multiplies a weighting factor by the difference signal before the difference signal is applied to the absolute value circuit.

6. A power spectrum estimator, comprising:
   a pulse extraction circuit that compares a digital input signal with a first delayed version of the digital input signal to produce a first extracted pulse output signal containing extracted pulses of a first pulse width, and compares the digital input signal with a second delayed version of the digital input signal to produce a second extracted pulse output signal containing extracted pulses of a second pulse width;
   a first averaging circuit receiving the first extracted pulse output and producing a first averaged value of the output signal to produce a first averaged signal;
   a first subtracter that subtracts a first reference signal from the first averaged signal to produce a first difference signal;
   a second averaging circuit receiving the second extracted pulse and producing a second averaged value of the output signal to produce a second averaged signal;
   a second subtracter that subtracts a second reference signal from the second averaged signal to produce a second difference signal; and
   an adder that adds the magnitude of the first difference signal to the magnitude of the second difference signal to produce an output error signal.

7. A power spectrum estimator according to claim 6, wherein:
   the pulse extraction circuit compares the digital input signal with a third delayed version of the digital input signal to produce a third extracted pulse output signal containing extracted pulses of a third pulse width; and further comprising:
   a third averaging circuit receiving the third extracted pulse and producing a third averaged value of the output signal to produce a third averaged signal;
   a third subtracter that subtracts a third reference signal from the third averaged signal to produce a third difference signal; and
   wherein the adder further adds the magnitude of the third error signal to the first and second error signals to produce the output error signal.

8. The power spectrum estimator according to claim 7, wherein at least one of the first, second and third reference signals comprises a random digital signal passed through a pulse extraction circuit and an averaging circuit.

9. The power spectrum estimator according to claim 7, wherein the second delayed version of the input signal is delayed by approximately twice the delay of the first delayed version of the input signal, and wherein the third delayed version of the input signal is delayed by approximately three times the delay of the first delayed version of the input signal.

10. The power spectrum estimator according to claim 7, wherein at least one of the first, second and third averaging circuits comprises a low pass filter.

11. The power spectrum estimator according to claim 7, further comprising at least one of the following:
    a first weighting value multiplier that multiplies a first weighting factor by the first difference signal before the first difference signal is applied to the adder.
    a second weighting value multiplier that multiplies a second weighting factor by the second difference signal before the second difference signal is applied to the adder; and
    a third weighting value multiplier that multiplies a third weighting factor by the third difference signal before the third difference signal is applied to the adder.

12. The power spectrum estimator according to claim 6, further comprising a tapped delay line, and wherein the first and second delayed versions of the input signal are produced by passing the input signal through a tapped delay line and extracting the first and second delayed versions of the input signal from delay line taps.

13. The power spectrum estimator according to claim 12, further comprising one of a phase locked loop and a delay locked loop, that generates a delay correction signal that adjusts the delay of the first and second delayed versions of the input signal.

14. The power spectrum estimator according to claim 7, wherein the third delayed version of the input signal is produced by passing the input signal through the tapped delay line and extracting the third delayed version of the input signal from a delay line tap.

15. The power spectrum estimator according to claim 14, further comprising one of a phase locked loop and delay locked loop that generates a delay correction signal that adjusts the delay of the third delayed version of the input signal.

16. The power spectrum estimator according to claim 6, further comprising:
    a finite impulse response filter having tap weight values; and
    a tap weight calculator receiving the output error signal and converting the output error signal to adjust the tap weight values.

17. An apparatus that estimates power in a signal, comprising:
    means for extracting pulses of a specified pulse width from the signal;
    means, coupled to the extracting means, for filtering the extracted pulses to produce a filtered pulse signal;
    means, coupled to the filtering means, for subtracting the filtered pulse signal from a reference to produce a difference signal as an output, such output representing an estimate of power in the signal; and generating a coded weight function of the output to control tap weights of a digital filter.

18. The apparatus according to claim 17, further comprising means, coupled to the subtracting means, for taking the absolute value of the difference signal to represent the estimate of power in the signal.

19. The apparatus according to claim 17, further comprising means for applying a weighting factor to the difference signal.

20. The apparatus according to claim 17, further comprising means for converting the estimate of power to a digital value.

21. An apparatus that estimates power in a signal, comprising:
   means for extracting pulses of a plurality of specified pulse widths from the signal to produce a extracted pulses at each specified pulse width;
   means, coupled to the extracting means, for filtering the extracted pulses of each specified pulse width to produce a plurality of filtered pulse signals;
   means, coupled to the extracting means, for subtracting each of the filtered pulse signals from a corresponding reference to produce a plurality of difference signals; and
   means, coupled to the extracting means, for adding each of the difference signals to produce a sum as an output signal, such output signal representing an estimate of power in the signal, and for generating a coded weight function of the output to control tap weights of a digital filter.

22. The apparatus according to claim 21, further comprising means for taking the absolute value of each of the difference signals prior to adding.

23. The apparatus according to claim 21, further comprising means for applying a weighting factor to each of the difference signals prior to the adding.

24. The apparatus according to claim 21, further comprising means for converting the estimate of power to a digital value.

25. The apparatus according to claim 21, further comprising means for applying a filter tap weight calculating algorithm to the estimate of power to calculate a filter tap weight value.

26. A power spectrum estimator, comprising:
   a pulse extraction circuit that compares a digital input signal with a delayed version of the digital input signal to produce an output signal containing extracted pulses;
   a counter circuit receiving the output pulse and producing therefrom a count over a time interval representing the averaged value of the output signal;
   a subtracter that subtracts a reference count from the averaged signal to produce a difference signal; and
   an absolute value circuit that converts the difference signal to an error signal by taking the absolute value of the difference signal.

27. The power spectrum estimator according to claim 26, wherein the reference signal comprises a random digital signal passed through a counter.

28. The power spectrum estimator according to claim 26, wherein the power spectrum estimator estimates the power spectrum using pulse extraction logic circuits that extract pulses of at least one of: one, two and three different pulse widths.

29. The power spectrum estimator according to claim 26, further comprising a weighting value multiplier that multiplies a weighting factor by the difference signal before the difference signal is applied to the absolute value circuit.

* * * * *